US012392639B2

(12) United States Patent
Sisbot et al.

(10) Patent No.: US 12,392,639 B2
(45) Date of Patent: Aug. 19, 2025

(54) SYSTEM AND METHOD TO GENERATE A LANE-LEVEL TRAFFIC MAP USING VEHICLE SENSOR DATA

(71) Applicant: TOYOTA MOTOR ENGINEERING & MANUFACTURING NORTH AMERICA, INC., Plano, TX (US)

(72) Inventors: Emrah Akin Sisbot, Mountain View, CA (US); Yashar Zeiynali Farid, Mountain View, CA (US); Xiaofei Cao, Mountain View, CA (US); Haritha Muralidharan, Mountain View, CA (US); Kentaro Oguchi, Mountain View, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 207 days.

(21) Appl. No.: 18/165,646

(22) Filed: Feb. 7, 2023

(65) Prior Publication Data

US 2024/0263963 A1 Aug. 8, 2024

(51) Int. Cl.
*G01C 21/00* (2006.01)
*G01C 21/36* (2006.01)

(52) U.S. Cl.
CPC ..... *G01C 21/3837* (2020.08); *G01C 21/3691* (2013.01); *G01C 21/3807* (2020.08)

(58) Field of Classification Search
CPC ............ G01C 21/3837; G01C 21/3691; G01C 21/3807
See application file for complete search history.

(56) References Cited

U.S. PATENT DOCUMENTS

| 10,082,792 B2 | 9/2018 | Miyake |
| 10,403,133 B1 | 9/2019 | Christensen |
| 2020/0211370 A1* | 7/2020 | Chen .................... G08G 1/0112 |

(Continued)

FOREIGN PATENT DOCUMENTS

| CN | 111583630 A * | 8/2020 | ............ G01C 21/32 |
| DE | 4230960 A2 * | 1/2022 | ............ G01C 21/00 |

(Continued)

OTHER PUBLICATIONS

R. Meng, S. Nelakuditi, S. Wang and R. R. Choudhury, "OmniView: A mobile collaborative system for assisting drivers with a map of surrounding traffic," 2015 International Conference on Computing, Networking and Communications (ICNC), Garden Grove, CA, USA, 2015, pp. 760-765 (Year: 2015).*

(Continued)

*Primary Examiner* — Peter D Nolan
*Assistant Examiner* — Brittany Renee Peko
(74) *Attorney, Agent, or Firm* — SHEPPARD, MULLIN, RICHTER & HAMPTON LLP; Daniel N. Yannuzzi

(57) ABSTRACT

Systems and methods are provided for generating a real-time lane-level traffic map based on outbound sensor information. In particular, some embodiments generate lane-level traffic maps using radar sensor information. The populated real-time lane-level traffic maps are shared to other vehicles and may be used by autonomous vehicle systems to maneuver the vehicle.

20 Claims, 6 Drawing Sheets

(56) References Cited

U.S. PATENT DOCUMENTS

2020/0324795 A1   10/2020  Bojarski
2022/0113723 A1    4/2022  Gross
2023/0022335 A1*  1/2023  Kang .................... G01S 13/89

FOREIGN PATENT DOCUMENTS

| JP | 4912007 B2 | 4/2012 |
|----|------------|--------|
| JP | 5439004 B2 | 3/2014 |
| KR | 20180086632 A | 8/2018 |
| KR | 20200139407 A | 12/2020 |
| KR | 102255595 | 5/2021 |

OTHER PUBLICATIONS

Pokorny, Pavel. "Determining traffic levels in cities using google maps." 2017 Fourth International Conference on Mathematics and Computers in Sciences and in Industry (MCSI). IEEE, 2017. (Year: 2017).*

* cited by examiner

SYSTEM AND METHOD TO GENERATE A LANE-LEVEL TRAFFIC MAP USING VEHICLE SENSOR DATA

TECHNICAL FIELD

The present disclosure relates generally to a traffic detection system, and in particular, some implementations may relate to systems and methods for generating a lane-level traffic map using vehicle sensor data.

DESCRIPTION OF RELATED ART

There are different types of technology currently in use for traffic detection and traffic mapping. Traffic detection sensors are stationary sensors that use radar or other technologies to detect passing vehicles. These sensors measure the speed and volume of traffic to facilitate redesign of roads and the data from the sensors is seldom provided to drivers. On the other hand, drivers often use web mapping platforms, such as Google Maps or Apple Maps, for relevant traffic information. These applications gather global positioning system (GPS) data from users' smartphones and produce mostly accurate traffic reports.

BRIEF SUMMARY OF THE DISCLOSURE

According to various embodiments of the disclosed technology, a method can comprise: receiving sensor information from an outbound sensor of an ego vehicle traveling in a first direction on a multi-lane roadway; identifying, based on the received sensor information, locations of a plurality of other vehicles traveling in the same direction as the ego vehicle on the multi-lane roadway; calculating a speed for each of the plurality of other vehicles based on the received sensor information; generating a lane-level traffic map for the multi-lane roadway indicating a lane-by-lane traffic condition based on the identified locations and calculated speeds of each of the plurality of other vehicles.

In some embodiments, the outbound sensor of the ego vehicle comprises a radar sensor.

In some embodiments, generating the lane-level traffic map for the multi-lane roadway occurs between a rapid interval.

In some embodiments, the lane-by-lane traffic condition identifies speeds of traffic located at the identified locations.

In some embodiments, generating the lane-level traffic map for the multi-lane roadway further comprises: receiving a lane-level traffic map for the multi-lane roadway from different vehicles or from a cloud network database; and merging the lane-level traffic map for the multi-lane roadway with the lane-level traffic map for the multi-lane roadway from the different vehicles or from the cloud network database.

In some embodiments, the lane-level traffic map for the multi-lane roadway comprises a grid comprising cells.

In some embodiments, generating the lane-level traffic map for the multi-lane roadway further comprises populating the cells based on the identified locations of the plurality of other vehicles with a color from a gradient of color based on the calculated speeds of each of the plurality of other vehicles.

In some embodiments, the lane-level traffic map is sent to an autonomous driving system to facilitate maneuvering in response to the lane-by-lane traffic condition.

According to various embodiments of the disclosed technology, a system can comprise: a plurality of outbound sensors; a processor; a receiver; a transmitter; and a memory coupled to the processor to store instructions, which when executed by the processor, cause the processor to: receive sensor information from an outbound sensor of an ego vehicle traveling in a first direction on a multi-lane roadway; identify, based on the received sensor information, locations of a plurality of other vehicles traveling in the same direction as the ego vehicle on the multi-lane roadway; calculate a speed for each of the plurality of other vehicles based on the received sensor information; generate a lane-level traffic map for the multi-lane roadway indicating a lane-by-lane traffic condition based on the identified locations and calculated speeds of each of the plurality of other vehicles; and transmit the lane-level traffic map for the multi-lane roadway indicating the lane-by-lane traffic condition to a cloud network database.

In some embodiments, the outbound sensor of the ego vehicle comprises a radar sensor.

In some embodiments, generating the lane-level traffic map for the multi-lane roadway occurs between a rapid interval.

In some embodiments, the lane-by-lane traffic condition identifies speeds of traffic located at the identified locations.

In some embodiments, generating the lane-level traffic map for the multi-lane roadway further comprises: receiving a lane-level traffic map for the multi-lane roadway from different vehicles or from the cloud network database; and merging the lane-level traffic map for the multi-lane roadway with the lane-level traffic map for the multi-lane roadway from the different vehicles or from the cloud network database.

In some embodiments, the lane-level traffic map for the multi-lane roadway comprises a grid comprising cells.

In some embodiments, generating the lane-level traffic map for the multi-lane roadway further comprises populating the cells based on the identified locations of the plurality of other vehicles with a color from a gradient of color based on the calculated speeds of each of the plurality of other vehicles.

According to various embodiments of the disclosed technology, a system can comprise: a processor; a transmitter; a receiver; and a memory coupled to the processor to store instructions, which when executed by the processor, cause the processor to: receive sensor information from an ego vehicle traveling in a first direction on a multi-lane roadway; identify, based on the received sensor information, locations of a plurality of other vehicles traveling in the same direction as the ego vehicle on the multi-lane roadway; calculate a speed for each of the plurality of other vehicles based on the received sensor information; generate a lane-level traffic map for the multi-lane roadway indicating a lane-by-lane traffic condition based on the identified locations and calculated speeds of each of the plurality of other vehicles; and transmit the generated lane-level traffic map for the multi-lane roadway to the ego vehicle and other vehicles in traffic.

In some embodiments, the outbound sensor of the ego vehicle comprises a radar sensor.

In some embodiments, generating the lane-level traffic map for the multi-lane roadway occurs between a rapid interval.

In some embodiments, the lane-by-lane traffic condition identifies speeds of traffic located at the identified locations.

In some embodiments, the lane-level traffic map for the multi-lane roadway comprises a grid comprising cells.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
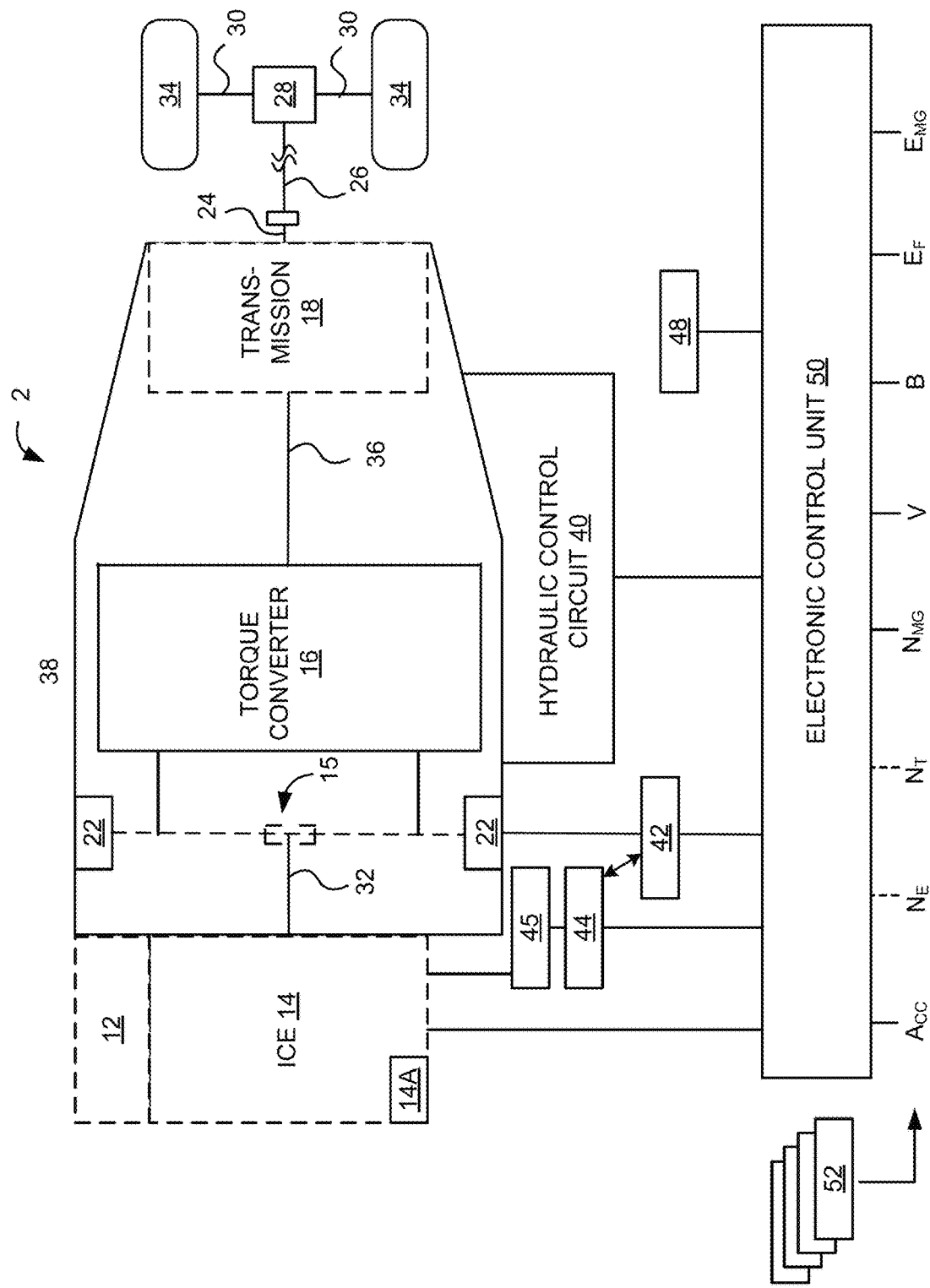
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

Embodiments of the present disclosure are directed to systems and methods for creating a real-time lane-level traffic map using positions and speeds of vehicles detected by vehicle radar sensors. The collected data of the positions and speeds are used to generate the real-time lane-level traffic map, which may be distributed to vehicle systems, and other vehicles through either a cloud network or through direct wireless communication.

Implementations of the systems and methods disclosed herein may be configured to utilize information collected from vehicles traveling on a roadway to create a lane-level traffic map. The system may be configured to create a lane-level traffic map based on positions and speeds of vehicles as detected by sensors on surrounding vehicles. Such a traffic map may be configured, for example, to show traffic flow or speeds on a lane-by-lane basis along a multi-lane roadway. Such configurations may be useful in situation where slowdowns or traffic jams are present on only certain lanes of a multi-lane roadway where other lanes of the same roadway in the same direction of travel are moving more quickly or are otherwise relatively open.

The systems and methods disclosed herein may be implemented to use information collected from multiple moving vehicles to create a map of lane-level traffic. Using real-time or near real-time information, the system can be configured to maintain up-to-date traffic information using the swarm of vehicles and using consensus among the swarm. Embodiments may be implemented using information from vehicles having only a single radar (or like) sensor. Using information from multiple vehicles can avoid the need to have multiple sensors to capture traffic information at each lane of the roadway.

In one application, an ego vehicle can use a front outbound sensor, such as a radar sensor, to detect vehicles in front of the ego vehicle or in adjacent lanes. Sensor information can be used to determine positions and speeds of the detected vehicles. This information along with the speed of the ego vehicle can be used to generate a real-time-lane-level traffic map. Further embodiments may use additional sensors such as, for example, a sight sensor and rear outbound sensors to obtain additional traffic information. However embodiments may be implemented to the utilize data from only a single sensor to gather information about adjacent vehicles.

As noted above, the outbound sensor used can be a radar sensor to collect information used to determine the presence, location and speed of travel of adjacent vehicles. Other outbound sensors may be used including, for example, a LIDAR sensor, a camera, an infrared sensor and others that are capable of detecting surrounding traffic. In some embodiments, the outbound sensor can be a special-purpose sensor provided specifically for the purpose of generating the desired traffic map. In other embodiments, existing vehicle sensors can be used and the information therefrom can be processed to create the vehicle traffic map. As one example, information collected from a radar sensor used for adaptive cruise control or pre-sense warning can also be used to generate the desired traffic map.

Embodiments of the systems and methods disclosed herein may be configured to produce a more detailed traffic report. Unlike conventional web mapping platforms that only use GPS information, traffic reports generated using one or more sensors from a plurality of vehicles in a swarm can provide more detailed traffic information such as lane-by-lane traffic maps. Vehicles in the swarm may be configured to transmit data such as their location (obtained through GPS or otherwise) and velocity (obtained through GPS, vehicle speed sensors or otherwise), and the location and speed of nearby traffic as detected by the vehicles' outbound sensors. Because a given vehicle may be configured to determine the location and speed of adjacent vehicles, those vehicles can be accounted for when calculating the traffic map even if one or more of those vehicles themselves are not equipped to detect or transmit data regarding their own location or speed. Accordingly, vehicles that might otherwise be left out of the calculus can be utilized when determining the traffic map.

In addition, sensors like outbound sensors, vehicle speed sensors and other sensors used to gather relevant information may be able to provide information at a higher degree of accuracy than that obtained by GPS or other like technologies. Accordingly, embodiments may be able to use this information to generate more accurate or more detailed traffic reports. For example, while GPS information might not be precise enough to allow lane-by-lane traffic measurements, information from outbound sensors may be used to delineate traffic within individual lanes of the road and report the real-time speed of traffic for each lane of the road. In some embodiments, the real-time, lane-level traffic map may be generated as a plurality of cells, which may be arranged in a grid. Each lane of the subject roadway may be represented by a row (or column) of cells in the grid. Each cell within a row may be used to represent a location in the lane represented by that row. Each cell may have data associated with it representing the speed in that cell. This speed can be the measured instantaneous speed of a vehicle at the location represented by that cell or it can be an average speed for the cell as detected over a given period of time. The system may be configured to characterize traffic flow based on the speeds associated with the cells in the grid. For example, grouping of cells with an average speed below a determined threshold speed might be identified by the system as a traffic jam section, and the real-time lane-level traffic map may be used to alert upcoming vehicles about the traffic jam and its location. Vehicles receiving these alerts may be informed that they need to slow down to avoid a potential collision or that they should change lanes to avoid the traffic jam.

The traffic flow information may be used by the system to alert the driver of upcoming traffic conditions with specificity. This specificity might include, for example, a traffic jam or slowdown location, which might be expressed in terms of distance from the ego vehicle. This information might also include the specific lane in which the traffic condition exists. As another example, the system may provide the ego vehicle with a graphical or other representation of the traffic map that can be displayed to the vehicle driver or passengers. The map may display the aforementioned grid or other representation so that the vehicle occupants may observe a visual indication of the detected traffic conditions. For example, cells of the grid may be populated with some designator, such as filling the cells with a color, to indicate the speed of traffic at locations within the grid. Therefore, rather than providing the average speed of traffic across all lanes, the system may be configured to provide more granular reporting, including lane-by-lane reporting and or accurate reporting of distance from the ego vehicle.

The generated real-time lane-level traffic report (whether in the form of a grid or otherwise) may be provided to other vehicles whether the other vehicles are connected to the same network or in direct communication with the ego vehicle. The produced traffic report may merge with traffic reports of upstream (i.e., ahead of the vehicle) and downstream (i.e., behind the vehicle) traffic to generate a more expansive traffic report. Accordingly, even vehicles without sensors to produce the information used to generate the traffic report may still benefit by receiving the generated traffic report by a communication with other vehicles or with a server.

Embodiments may be implemented such that the information is collected from the participating vehicles and processed on a server (e.g., a cloud based server) to generate the real-time traffic report and to send that report to vehicles in communicative contact with the server. In other embodiments, traffic information may be received by participating vehicles and each vehicle may generate its own traffic report. In still further embodiments, the processing may be shared among a plurality of vehicles.

In some embodiments, the report is provided to autonomous driving systems (e.g., autonomous driving levels 1-5) such that the autonomous driving systems can use the information in the traffic report to maneuver the vehicle to reduce the potential impact of a detected traffic slowdown. For example, the autonomous driving system, such as an in-vehicle lane-change assistance service, may use the information to maneuver around slower traffic to reduce travel time. As another example, the autonomous driving system may slow the vehicle in advance of the traffic jam to avoid the need for a panic stop.

The description of real-time reporting takes into consideration the communication and calculation latencies. Therefore, embodiments of the described methods and operations occur within a rapid interval in order to maximize the relevance of the generated traffic map. In one embodiment, this rapid interval is one second. Here, a traffic map is generated within every one second during operation. In some embodiments, the interval between generation of the traffic map may be longer than the rapid interval of one second.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principles disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for generating a real-time lane-level traffic grid using vehicle radar sensor can be implemented in other types of vehicle including gasoline- or diesel-powered vehicles, fuel-cell vehicles, electric vehicles, or other vehicles. It should be understood that various embodiments disclosed herein may be applicable to/used in various vehicles (internal combustion engine (ICE) vehicles, fully electric vehicles (EVs), etc.) that are fully or partially autonomously controlled/operated, not only HEVs.

FIG. 1 illustrates a drive system of a vehicle 100 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 100 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14.

In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, nickel-metal hydride batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 100 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 100. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 100 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, LIDAR or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
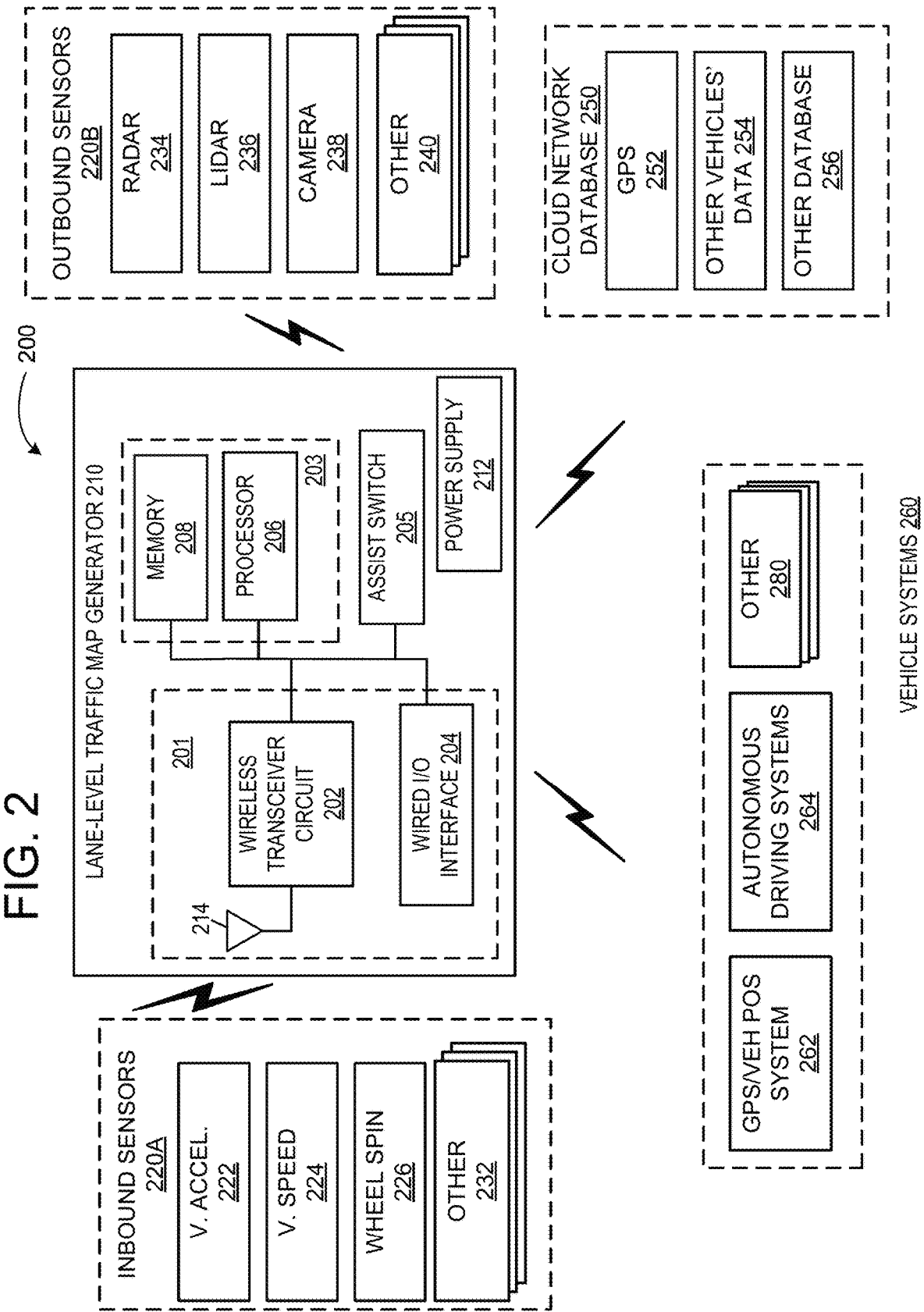
FIG. 2 illustrates an example architecture for a system using vehicle information to create a lane-level traffic map using a lane-level traffic map generator in accordance with one embodiment of the systems and methods described herein.

FIG. 2 illustrates an example architecture for a system using vehicle information to create a lane-level mapping system using a lane-level traffic map generator service in accordance with one embodiment of the systems and methods described herein. Referring now to FIG. 2, in this example, lane-level mapping system 200 includes lane-level traffic map generator 210, a plurality of inbound sensors 220A, a plurality of outbound sensors 220B, a cloud network database 250 and a plurality of vehicle systems 260. Sensors 220A, 220B, cloud network database 250, and vehicle systems 260 can communicate with lane-level traffic map generator 210 via a wired or wireless communication interface. Although sensors 220A, 220B, cloud network database 250, and vehicle systems 260 are depicted as communicating with lane-level traffic map generator 210, they can also communicate with each other as well as with other vehicle systems.

Lane-level traffic map generator 210 can be implemented as an ECU or as part of an ECU such as, for example electronic control unit 50. In other embodiments, lane-level traffic map generator 210 can be implemented as an independent processor from the ECU. In some embodiments, some or all of the processing capabilities of lane-level traffic map generator 210 can be distributed among various vehicles and may also be implemented within a server system, such as a cloud based server.

Lane-level traffic map generator 210 in this example includes a communication circuit 201, a determination circuit 203 (including a processor 206 and memory 208 in this example) and a power supply 212. Components of lane-level traffic map generator 210 are illustrated as communicating with each other via a data bus, although other communication interfaces can be included. Lane-level traffic map generator 210 in this example also includes a manual assist switch 205 that can be operated by the user to manually activate lane-level traffic map generator 210.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to lane-level traffic map generator 210.

Although the example of FIG. 2 is illustrated using processor and memory circuitry, as described below with reference to circuits disclosed herein, determination circuit 203 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up lane-level traffic map generator 210.

Communication circuit 201 includes either or both a wireless transceiver circuit 202 with an associated antenna 214 and a wired I/O interface 204 with an associated hardwired data port (not illustrated). As this example illustrates, communications with lane-level traffic map generator 210 can include either or both wired and wireless communications circuits 201. Wireless transceiver circuit 202 can include a transmitter and a receiver (not shown) to allow wireless communications via any of a number of communication protocols such as, for example, Wifi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit signals wirelessly to wireless equipment or cloud network database 250 with which it is connected and to receive signals as well. These signals can include information of almost any sort that is sent or received by lane-level traffic map generator 210 to/from other entities such as sensors 220A, 220B, and vehicle systems 260.

Wired I/O interface 204 can include a transmitter and a receiver (not shown) for hardwired communications with other devices. For example, wired I/O interface 204 can provide a hardwired interface to other components, including sensors 220A, 220B and vehicle systems 260. Wired I/O interface 204 can communicate with other devices using Ethernet or any of a number of other wired communication protocols whether standardized, proprietary, open, point-to-point, networked or otherwise.

Power supply 212 can include one or more of a battery or batteries (such as, e.g., Li-ion, Li-Polymer, NiMH, NiCd, NiZn, and NiH$_2$, to name a few, whether rechargeable or primary batteries), a power connector (e.g., to connect to vehicle supplied power, etc.), an energy harvester (e.g., solar cells, piezoelectric system, etc.), or it can include any other suitable power supply.

Inbound sensors 220A can include, for example, sensors 52 such as those described above with reference to the example of FIG. 1. Sensors 220A can include additional sensors that may or may not otherwise be included on a standard vehicle with which the lane-level mapping system 200 is implemented. In the illustrated example, inbound sensors 220A include vehicle acceleration sensors 222, vehicle speed sensors 224, and wheelspin sensors 226 (e.g., one for each wheel). Other sensors 232 can also be included as may be appropriate for a given implementation of lane-level mapping system 200.

Outbound sensors 220B can include, for example, sensors 52 such as those described above with reference to the example of FIG. 1. Sensors 220B can include additional sensors that may or may not otherwise be included on a standard vehicle with which the lane-level mapping system 200 is implemented. In the illustrated example, sensors 220B include radar sensor 234, LIDAR sensor 236, camera 238 and other sensors 240 to detect conditions external to the vehicle.

Lane-level traffic map generator 210 can maintain regular communication with cloud network database 250. Lane-level traffic map generator 210 may receive GPS information 252, other vehicles' data 254, or information from other database 256. The received information may be used to expand the scope of the real-time lane-level traffic grid.

Vehicle systems 260 can include any of a number of different vehicle components or subsystems used to control or monitor various aspects of the vehicle and its performance. In this example, the vehicle systems 260 include a GPS or other location-based technology systems 262, autonomous driving systems 264, which may include any advanced driver assistance system (ADAS) or advanced driving system (ADS), and other vehicle systems 280.

Figure 3:
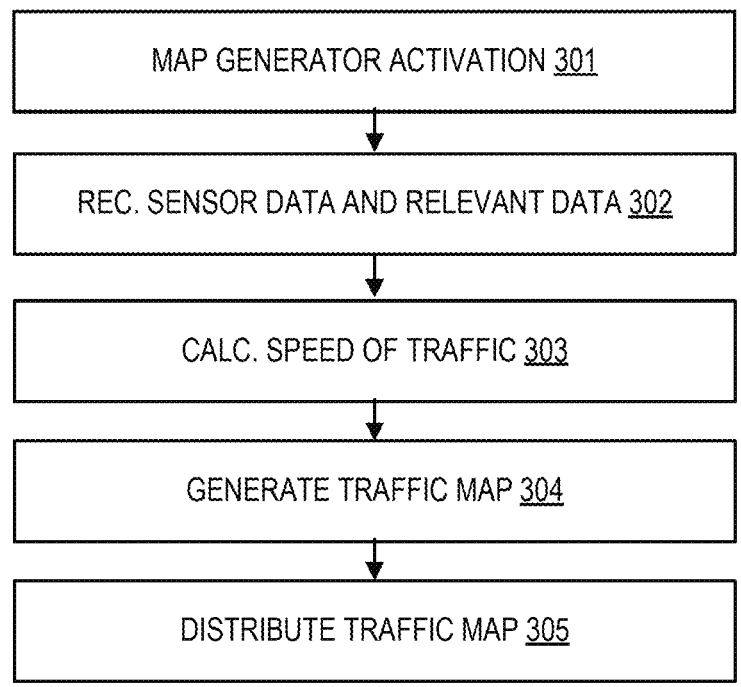
FIG. 3 illustrates an example method of generating a lane-level traffic map using a lane-level traffic map generator in accordance with one embodiment of the systems and methods described herein.

FIG. 3 illustrates an example method of generating a lane-level traffic grid using a lane-level traffic map generator in accordance with one embodiment of the systems and methods described herein. The following operations may be performed at either an ego vehicle, a server system (e.g., a cloud based server), a plurality of other vehicles or a combination of the foregoing. For example, operations may be implemented by an ECU of the ego vehicle, by a dedicated processing system of the ego vehicle or by a server remote from the vehicle. The following operations may be completed at real-time or close to real-time based on communication or processing latencies.

At operation 301 the lane-level mapping system may be activated. For example, in terms of the embodiment described with reference to FIG. 2, lane-level traffic map generator 210 may be activated through assist switch 205 or the activation may be requested by vehicle systems 260, such as autonomous driving systems 264. In further embodiments, the lane-level mapping system can be configured to continuously operate during vehicle operation. In some embodiments, the processing capabilities of the lane-level mapping system may be distributed over multiple vehicles or within a server in a cloud network. In these embodiments, the individual processors of the lane-level mapping system may wait in idle for a request for information that prompts the activation of the individual processors of the system.

At operation 302, the lane-level mapping system receives vehicle sensor information and relevant data. The received information may come from at least one of inbound sensors, outbound sensors, vehicle systems, and a cloud network database.

Information retrieved from outbound sensors is usually the primary source of information for identifying road characteristics. Road characteristics may include information about the surrounding traffic, such as its location and its speed, the number of lanes of the road and the speed limit of the road. In many embodiments, a radar sensor of the ego vehicle serves as the primary source of information to detect the road characteristics. In other embodiments, a LIDAR sensor may be used, as supplement or in lieu of, the radar sensor. A camera may provide information pertaining to the characteristic of the road. This may include the speed limit based on recognition of the speed limit sign and lane boundaries. The camera may also provide supplemental information for locating traffic. Other outbound sensors may include sensor types that were not previously mentioned, but are also capable of providing relevant information, such as an infrared sensor. In some embodiments, information obtained from outbound sensors may be used in lieu of inbound sensors to determine the speed of the ego vehicle.

Information retrieved from inbound sensor may be used to calculate the speed of the ego vehicle, which in turn helps calculate the speed of traffic. This may include ego vehicle's acceleration, speed, and measured wheel spin. In some embodiments, the trajectory of the vehicle may also be retrieved in order to compensate for road curvature or maneuvering by the ego vehicle. For example, the ego vehicle may be changing lanes during retrieval of information. Because the ego vehicle is not traveling within lane boundaries, the ego vehicle trajectory may be relevant for calculating the speed of traffic that are traveling within the lane boundaries. The vehicle trajectory may be retrieved through other inbound sensors, such as steering position, lateral gravitational sensor, etc.

Information retrieved from vehicle systems may include those that are relevant to generating a lane-level traffic map. In some embodiments, a GPS/vehicle position system may retain road information such as the number of lanes, the speed limit, and existence of road closures and construction zones. The information from vehicle systems may supplement the information from outbound sensors. The autonomous driving systems may also provide the speed and direction of the ego vehicle that may supplement, or may be used in lieu of, the information provided by inbound sensors or outbound sensors.

Information retrieved from the cloud network database may include GPS information, other vehicles' data, or other data from other databases. GPS information may be similar to the GPS/vehicle position system. In some embodiments, if the processing capabilities are located within a cloud based server, other vehicles' data may include other vehicles' sensor data. In some embodiments, if the processing capabilities are distributed among vehicles in traffic, other vehicle data may include lane-level traffic maps generated by other vehicles. In some embodiments, other database may include a shell traffic map generated by a separate processor on which the lane-level traffic map generator may populate the speed of traffic.

In many embodiments, a single instance of retrieval of information from the aforementioned sources completes operation 302. In some embodiments, operation 302 may include additional instances of retrieval from the above mentioned sources. The additional instances of retrieved information may be used to calculate the speed of traffic or may be used to supplement the preceding instances of retrieved information.

At operation 303, the speed of traffic may be calculated. In many embodiments, the speed of traffic is determined by using the relative speed of traffic retrieved from operation 302 and incorporating the speed of the ego vehicle. For example, the lane-level traffic map generator may calculate the speed of traffic using the vehicle speed from inbound sensors and the relative speed of traffic from the ego vehicle's radar sensor. In other embodiments, operation 303 may include both the calculation of the relative speed of traffic and the speed of traffic.

In some embodiments where processing capabilities are distributed throughout the vehicles, the ego vehicle's processor may calculate the speed of traffic not covered by data from other vehicles. The same applies for when the main processing capability is located within a cloud based server. The reliance of distributed calculation may facilitate the generating of traffic map within the rapid interval.

At operation 304, a lane-level traffic map may be generated. The lane-level traffic map displays lane-by-lane traffic conditions that indicate the severity of traffic at various locations within each lane. The severity of traffic is primarily based on the speed of traffic at various locations around the time when the traffic map is being generated. The severity of traffic may be based on the actual speed of traffic as compared to the speed limit. In various embodiments, the lane-by-lane traffic condition is a color to represent the speed of traffic.

In some embodiments, a location may be represented as a region of a lane. Regions within a lane may extend within or beyond a car length, with smaller regions resulting in finer data. The length of a region may be based on the speed limit of the multi-lane road. For example, if the multi-lane road is a freeway, then each region may include a larger length of a lane as compared to a city road. In some embodiments, the region size may be based on the detected average speed of traffic at or around the time of the lane-level mapping system activation. For example, a lane-level traffic map for the same freeway described above may include smaller regions during rush hour as compared to late night hours. In other embodiments, the length of a region is a fixed value that is preprogrammed within the lane-level mapping system. In some embodiments, the speed of traffic in each region may be an average speed of vehicles within each region. In other embodiments, the speed of traffic in each region is the speed of the slowest vehicle within each region.

The lane-level traffic map may characterize the traffic condition for some distance ahead of the ego vehicle. The scope of the lane-level traffic map may be based on what is detectable by the ego vehicle's sensors. For example, a radar sensor may only detect vehicles up to 300 feet ahead of the ego vehicle. In this instance, the lane-level traffic map may characterize the upcoming traffic condition within 300 feet of the ego vehicle. The generated lane-level traffic map may merge with lane-level traffic maps based on other vehicles' data to generate a more expansive lane-level traffic map.

In one embodiment, the lane-level traffic map updates a previously generated traffic map. As described previously, the lane-level traffic map is generated at or approximately in real-time between a rapid interval. The updating of previously generated traffic map necessitates only updating the changed traffic characteristics, thereby reducing the time required to complete the operation. Depending on whether the traffic map is generated by the cloud network server or by the vehicles, the previously generated traffic map and/or the generated traffic map may be stored within the cloud network server or within the vehicles. In some embodiments, the previously generated traffic map is replaced during every cycle of operation 304.

In some embodiments, the lane-level traffic map is a human-readable report. In many embodiments, the lane-level traffic map is a grid, which may include a plurality of rows to represent lanes and a plurality of cells within rows to represent regions within each lane. In this scenario, the human-readable lane-level traffic map may be displayed on a screen or other devices configured to display the information depicted on the lane-level traffic map, such as a diodes arranged to form a grid. In other embodiments, the lane-level traffic map may be a wholly machine-readable report for an autonomous vehicle. In other embodiments, the lane-level traffic map may be an audible data.

For the grid example, populating the lane-level traffic map may include assigning colors to the cells, wherein the colors represent the traffic conditions. Normally, the colors represent the speed of traffic in relation to the speed limit. Here, green can signify free flowing traffic, i.e. the vehicle is unobstructed of any traffic or the speed of traffic exceeds the speed limit, whereas red can signify traffic at near or complete stop. The cells can be filled with any color within a gradient of colors, such as a gradient of colors between green and red. In this example, yellow-green cells may signify traffic traveling at the speed limit, whereas yellow cells may signify traffic traveling below the speed limit.

At operation 305, the lane-level traffic map generator distributes the lane-level traffic map to vehicle systems, to other vehicles, and to the cloud network database. In some embodiments, the lane-level traffic map is directly provided to downstream traffic that are also configured with a traffic map generator or is configured to display or use the lane-level traffic map. In some embodiments, the transmission of the lane-level traffic map to the cloud network database is performed at incremental cycles of operation or between an interval of time.

The lane-level traffic map may be transmitted to various vehicle systems. The lane-level traffic map may be transmitted to an autonomous driving system or other systems, such as an infotainment system to display the traffic map, as suggestions to maneuver the ego vehicle to bypass slower traffic. These suggestions may be considered by the autonomous driving system. In some embodiments, the autonomous driving system may recognize that changing lanes is inappropriate despite lane-level traffic map generator's recommendations. Here, other factors that were not considered by the lane-level traffic map generator may contribute to this objection. One such factor may be directions to the destination. For example, if the ego vehicle is approaching a traffic light to make a left turn, even if the lane-level traffic map generator indicated a free flowing traffic in a rightmost lane, while the leftmost lane is riddled with traffic, the autonomous driving system may ignore this suggestion because the traffic is the queue to turn left at the traffic light. Another factor may be road laws. For example, while the ego vehicle is traveling in the fast lane with double-line (i.e. lines that may not legally be crossed) dividing the fast lane and the carpool lane, even if the lane-level traffic map generator recognizes that the carpool lane is more free flowing as compared to the fast lane, the autonomous driving system may recognize the illegality of this maneuver and will ignore this suggestion.

Figure 4:
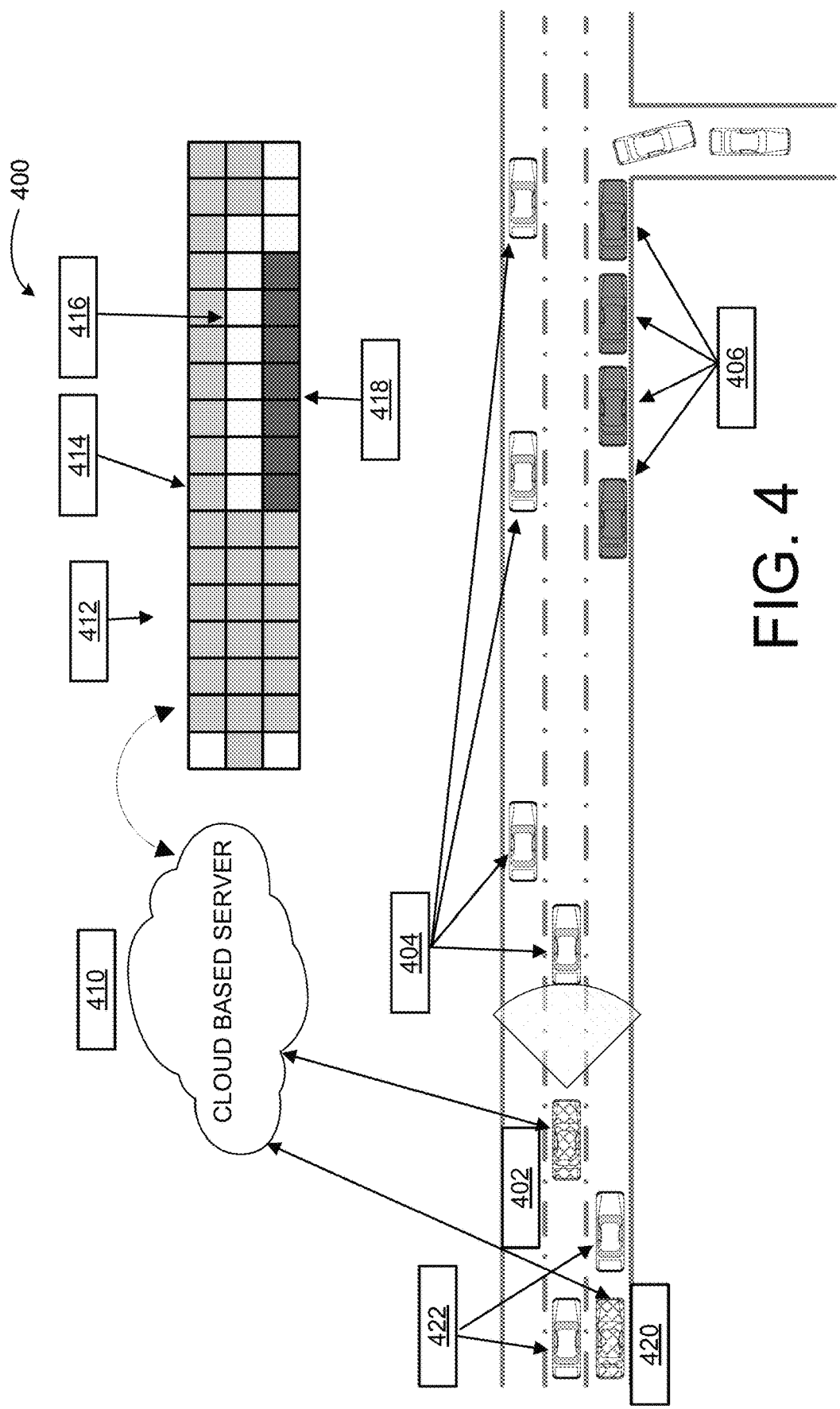
FIG. 4 illustrates an example architecture of a lane-level mapping system in accordance with one embodiment of the systems and methods described herein.

FIG. 4 illustrates an example architecture of a lane-level mapping system in accordance with one embodiment of the systems and methods described herein. As mentioned previously, some or all of the processors of the lane-level mapping system may be implemented through vehicles or through a cloud based server. In the embodiment described under FIG. 4, a lane-level traffic map is generated by cloud based server 410. The items portrayed in FIG. 4 are described in further detail below.

Lane-level mapping system 400 may utilize information provided by ego vehicle 402 to generate a lane-level traffic map. In this example, the reported lane-level traffic map is in a form of a human-readable grid. In some embodiments, the report may be a non-grid map. In other embodiments, the report may be a non-human-readable report.

Ego vehicle 402 collects and transmits sensor information to cloud based server 410. Information transmitted by ego vehicle 402 may include any combination of inbound and outbound sensor information and information from vehicle systems. Traffic 404 represents traffic traveling at speed limit. Traffic 406 represents halted traffic. The location of traffic 404 and 406 are detected by ego vehicle 402 and transmitted to cloud based server 410. Traffic 404 and 406 may be detected through any combination of ego vehicle's outbound sensors. Any vehicles among traffic 404 and traffic 406 may also have outbound sensors and may also be connected to the network. In this example, traffic 404 and 406 are not configured to access cloud based server 410.

Using the received information, cloud based server 410 may calculate the speed of detected traffic and generate grid 412. The speed of traffic may be an average speed over a given time or may be an instantaneous speed. The example grid 412 of FIG. 4 comprises three rows and numerous columns to signify locations within each lane. Furthermore, the example grid shows three distinct shades of grey. A traffic map may use any number of colors. Cells 414 are light grey to signify regions where traffic speed in this region is traveling approximately at the speed limit. Cells 416 are white to signify a region where there is free flowing traffic. Cells 418 are dark grey to signify regions where traffic speed is below the speed of traffic. Cells 414 are occupied with traffic 404, who are traveling at the speed limit. Cells 418 are occupied with traffic 406, who are in queue to make a right turn.

The associated colors of cells may correlate with an amount of exceedance over a threshold value. The system may be programmed with numerous threshold values wherein various colors represent amounts of exceedance of various threshold values. For example, grid 412 may have five colors associated with the speed of traffic. In this example, green may represent a free flowing traffic or traffic traveling at speed greater than the speed limit. The remaining four colors may represent 25% reduction of the next higher threshold speed. Therefore, yellow-green may represent traffic traveling above 75% of the speed limit, yellow may represent traffic traveling above 50% of the speed limit, orange may represent traffic traveling above 25% of the speed limit, and red representing traffic traveling below 25% of the speed limit.

In some embodiments, the threshold value may be of finer increments. The previous example included five thresholds, however the number of thresholds can be increased. In some embodiments, the number of threshold is less than five. In some embodiments, the threshold values may be pre-programmed by the manufacturer, which may be referred to as a default structure. In other embodiments, the driver may configure the threshold values. The driver may adjust the threshold value for certain colors or eliminate a threshold altogether. For example, a driver may opt for a slower driving style. This may be achieved by reducing the threshold value for a desired speed. Referring to the previous example of five threshold levels, the threshold value for green may be adjusted to 75% of the speed limit. Under this condition, the traffic map generator will only recommend lane changes if the speed of the ego vehicle's lane is below 75% of the speed limit, whereas the previous example may lead to recommendations whenever the car is not traveling at or above the speed limit.

Grid 412 may be transmitted by cloud based server 410 to vehicle 402. Vehicle 420, a downstream vehicle that is also configured to communicate with cloud based server 410, may also send its vehicle data and outbound sensor information to cloud based server 410. Here, cloud network may use the generated grid 412 to create a grid tailored for vehicle 420. The new grid (not shown) may include radar sensor data for traffic 422. The new grid may be transmitted to vehicle 420 for use.

Grid 412 may facilitate vehicle 402 to maneuver around traffic. Grid 412 may be processed by an autonomous driving system of vehicle 402 that decide if lane change is warranted. Here, the autonomous driving system of vehicle 402 may receive information of traffic 404 and 406. Because traffic 404 is traveling at the speed limit, the autonomous driving system of vehicle 402 may be satisfied with the lane's speed and will remain in the same lane. In contrast, vehicle 420 may behave differently based on the new grid. The autonomous driving system of vehicle 420 may become aware of traffic 406 and may attempt to change lanes, but the vehicle is obstructed by traffic 422. Therefore, although the autonomous driving system of vehicle 420 may prefer to change lanes, vehicle 420 may be forced to decelerate in order to find an opening or may become stuck behind traffic 406. Furthermore, the autonomous driving system of vehicle 420 may ignore the notification of traffic because vehicle 420 must make the same right turn that is causing traffic.

Figure 5:
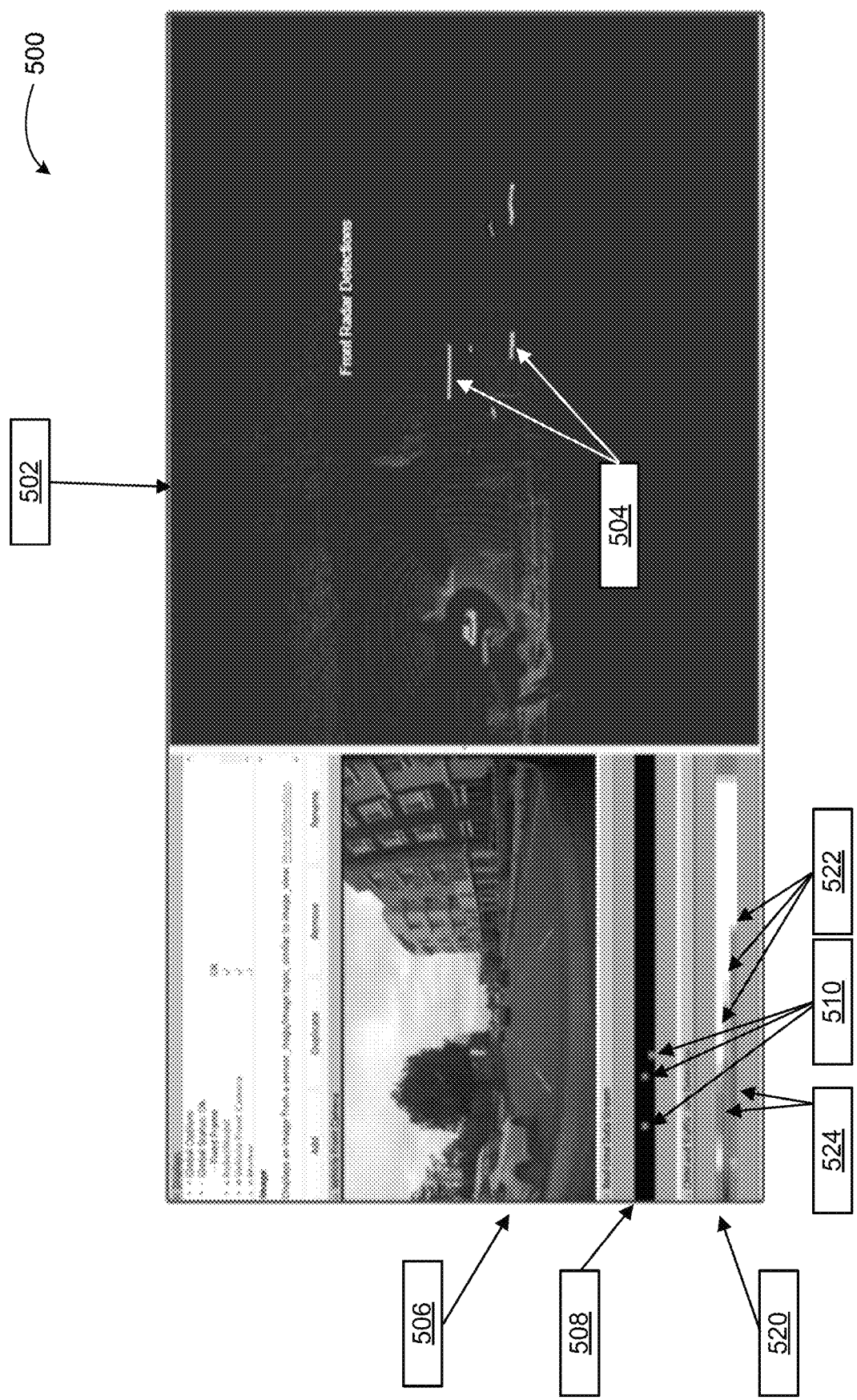
FIG. 5 illustrates an example graphical user interface of a vehicle with an active lane-level traffic mapping system in accordance with one embodiment of the systems and methods described herein.

FIG. 5 illustrates an example graphical user interface 500 of a vehicle with an active lane-level mapping system in accordance with one embodiment of the systems and methods described herein. GUI 500 may comprise elements including radar sensor input 502, camera input 506, real-time data stream of traffic 508, and grid 520. GUI 500, in its entirety, may be visible to the driver. In some embodiments, GUI 500 may include at least one visible element. In other embodiments, no element of GUI 500 is visible to the driver.

Radar sensor input 502 may include detected traffic 504. Radar sensor input 502 may be supplemented with data from other outbound sensors such as a LIDAR sensor, not displayed. Radar sensor input 502 may also be supplemented with other vehicle radar sensor input, not displayed. As explained above, the vehicle may use information detected and processed by other vehicles configured to communicate directly with the ego vehicle or through the same cloud network.

Camera input 506 may include information only detected by the front-facing camera. In some embodiments, other cameras facing different angles may be included. Camera input 506 may be included to supplement the radar sensor input 502 or may be used to detect the environment, such as the number of lanes.

Real-time stream of traffic 508 may represent the processed data based on camera input 506 and radar sensor input 502. Real-time stream of traffic 508 may be in a form of a grid that matches the characteristics, i.e. the number of rows and columns, of the grid 520. Blips 510 represent the detected traffic. Blips 510 may be used to calculate the relative speed of traffic that may be used to calculate the actual speed of traffic using vehicle telemetric information.

Grid 520 is an example traffic map generated by the lane-level mapping system. Regions 524 represent traffic 504 from radar sensor 502. Traffic 504 were determined to be traveling below the speed limit. Therefore, regions 524 were shaded to represent a color correlated with speed of traffic that are below the speed of free flowing traffic. Regions 522 represent regions of the road with free flowing traffic. Here, the free flowing regions are in front of regions 524, ahead of any traffic. The free flowing regions 522 correspond with the unoccupied areas detected by radar sensor 502.

Figure 6:
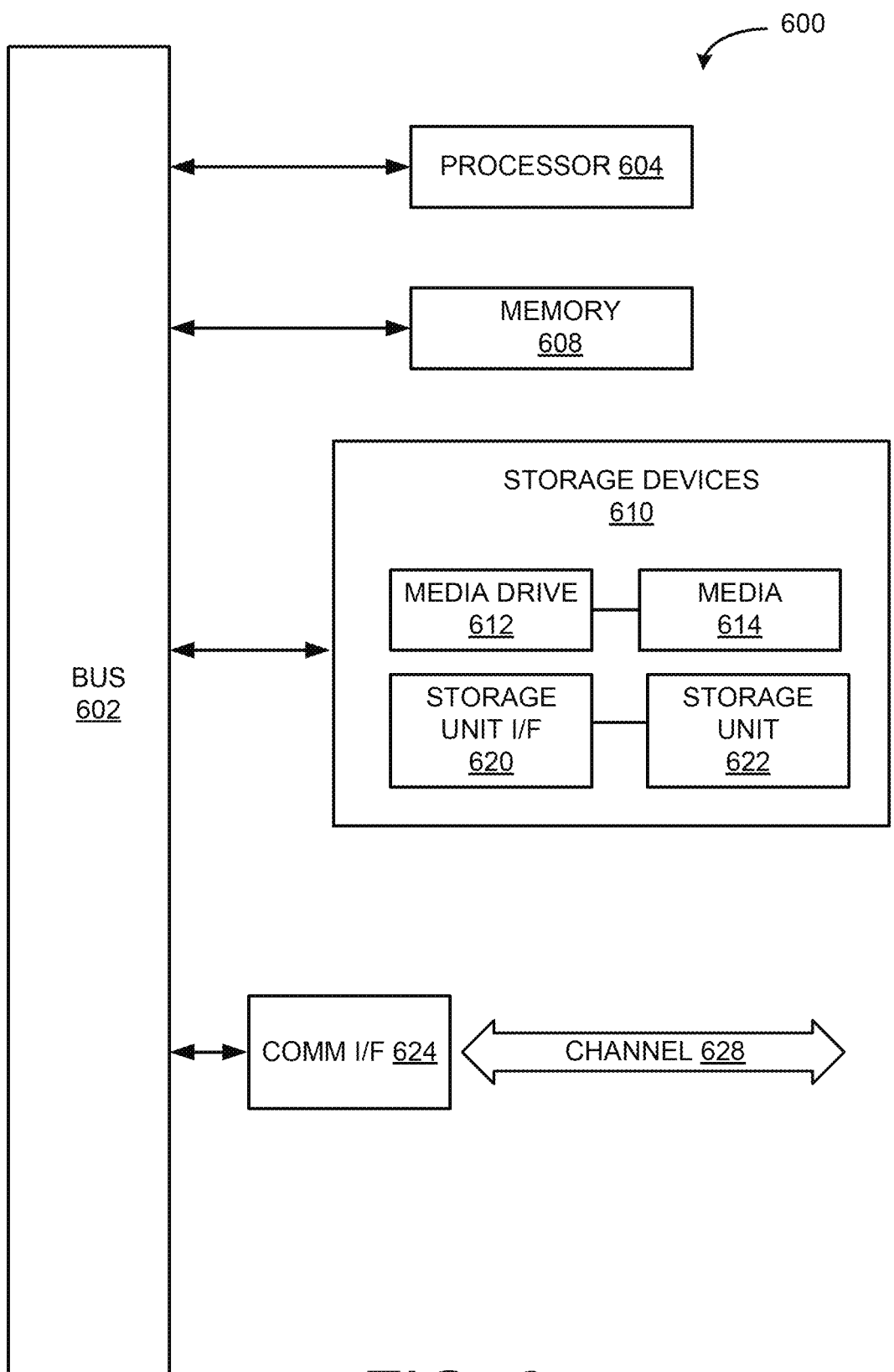
FIG. 6 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example, portable computing devices, and other electronic devices that might include some form of processing capability.

Computing component 600 might include, for example, one or more processors, controllers, control components, or other processing devices. This can include a processor, a memory, wireless transceiver circuit, wired I/O interface, assist switch, and a power supply. Processor 604 might be implemented using a general-purpose or special-purpose processing engine such as, for example, a microprocessor, controller, or other control logic. Processor 604 may be connected to a bus 602. However, any communication medium can be used to facilitate interaction with other components of computing component 600 or to communicate externally.

Computing component 600 might also include one or more memory components, simply referred to herein as main memory 608. For example, random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory (ROM) or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid-state drive, a magnetic tape drive, an optical drive, a compact disc (CD) or digital video disc (DVD) drive (R or RW), or other removable or fixed media drive might be provided. Storage media 614 might include, for example, a hard disk, an integrated circuit assembly, magnetic tape, cartridge, optical disk, a CD or DVD. Storage media 614 may be any other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot. Other examples may include a PCMCIA slot and card, and other fixed or removable storage units 622 and interfaces 620 that allow software and data to be transferred from storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 624 may be carried on signals, which can be electronic, electromagnetic (which includes optical) or other signals capable of being exchanged by a given communications interface 524. These signals might be provided to communications interface 624 via a channel 628. Channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described.

Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
   identifying, based on sensor information received from an ego vehicle, locations of other vehicles traveling in the same direction as the ego vehicle on a multi-lane roadway;
   calculating speeds for the other vehicles based on the received sensor information; and
   displaying, on a graphical user interface (GUI) of the ego vehicle, a lane-level traffic map for the multi-lane roadway indicating a lane-by-lane traffic condition based on the identified locations and calculated speeds, wherein the lane-level traffic map comprises regions arranged in rows, a respective row represents a respective lane of the multi-lane roadway, and a respective region represents a respective identified location, and wherein displaying the lane-level traffic map comprises determining and generating lengths of regions in the respective row based on at least one of:
   speeds of vehicles in the respective lane of the multi-lane roadway;
   a time of day;
   a speed limit on the multi-lane roadway; and
   a road type for the multi-lane roadway.

2. The method of claim 1, wherein the sensor information is received from a radar sensor of the ego vehicle.

3. The method of claim 1, wherein generating the lane-level traffic map for the multi-lane roadway occurs between a rapid interval.

4. The method of claim 1, wherein the lane-by-lane traffic condition identifies speeds of traffic located at the identified locations.

5. The method of claim 1, wherein generating the lane-level traffic map for the multi-lane roadway further comprises:
   receiving a lane-level traffic map for the multi-lane roadway from different vehicles or from a cloud network database; and
   merging the lane-level traffic map for the multi-lane roadway with the lane-level traffic map for the multi-lane roadway from the different vehicles or from the cloud network database.

6. The method of claim 1, wherein generating the lane-level traffic map for the multi-lane roadway further comprises populating the regions based on the identified locations of the other vehicles with a color from a gradient of color based on the calculated speeds of the other vehicles.

7. The method of claim 1, wherein the lane-level traffic map is sent to an autonomous driving system to facilitate maneuvering in response to the lane-by-lane traffic condition.

8. A vehicle comprising:
   one or more outbound sensors;
   one or more processors;
   memory coupled to the one or more processors to store instructions, which when executed by the one or more processors, cause the vehicle to:
      identify, based on sensor information received from the one or more outbound sensors, locations of other vehicles traveling in the same direction as the vehicle on a multi-lane roadway;
      calculate speeds for the other vehicles based on the received sensor information;
      generate a lane-level traffic map for the multi-lane roadway indicating a lane-by-lane traffic condition based on the identified locations and calculated speeds, wherein the lane-level traffic map comprises regions arranged in rows, a respective row represents a respective lane of the multi-lane roadway, and a respective region represents a respective identified location, and wherein generating the lane-level traffic map comprises determining and generating lengths of regions in the respective row based on at least one of:
         speeds of vehicles in the respective lane of the multi-lane roadway;
         a time of day;
         a speed limit on the multi-lane roadway; and
         a road type for the multi-lane roadway; and
      execute a maneuver for the vehicle based on the indicated lane-by-lane traffic condition.

9. The vehicle of claim 8, wherein the one or more sensors comprise a radar sensor.

10. The vehicle of claim 8, wherein generating the lane-level traffic map for the multi-lane roadway occurs between a rapid interval.

11. The vehicle of claim 8, wherein the lane-by-lane traffic condition identifies speeds of traffic located at the identified locations.

12. The vehicle of claim 8, wherein generating the lane-level traffic map for the multi-lane roadway further comprises:
   receiving a lane-level traffic map for the multi-lane roadway from different vehicles or from the cloud network database; and
   merging the lane-level traffic map for the multi-lane roadway with the lane-level traffic map for the multi-lane roadway from the different vehicles or from the cloud network database.

13. The vehicle of claim 8, wherein generating the lane-level traffic map for the multi-lane roadway further comprises populating the regions based on the identified locations of the other vehicles with a color from a gradient of color based on the calculated speeds of the other vehicles.

14. A system, comprising:
   a graphical user interface (GUI);
   one or more processors; and
   memory coupled to the one or more processors to store instructions, which when executed by the one or more processors, cause the system to:
      identify, based on sensor information received from an ego vehicle, locations of other vehicles traveling in the same direction as the ego vehicle on the multi-lane roadway;
      calculate speeds for the other vehicles based on the received sensor information; and
      display, on the GUI, a lane-level traffic map for the multi-lane roadway indicating a lane-by-lane traffic condition based on the identified locations and calculated speeds, wherein the lane-level traffic map comprises regions arranged in rows, a respective row represents a respective lane of the multi-lane roadway, and a respective region represents a respective identified location, and wherein displaying the lane-level traffic map comprises determining and generating lengths of regions in the respective row based on at least one of:
      speeds of vehicles in the respective lane of the multi-lane roadway;
      a time of day;
      a speed limit on the multi-lane roadway; and
      a road type for the multi-lane roadway.

15. The system of claim 14, wherein the sensor information is received from a radar sensor of the ego vehicle.

16. The system of claim 14, wherein the generating the lane-level traffic map for the multi-lane roadway occurs between a rapid interval.

17. The system of claim 14, wherein the lane-by-lane traffic condition identifies speeds of traffic located at the identified locations.

18. The method of claim 1, further comprising executing a maneuver for at least one of the ego vehicle or one or more of the other vehicles based on the indicated lane-by-lane traffic condition.

19. The method of claim 18, wherein the executed maneuver comprises a lane change.

20. The vehicle of claim 8, wherein the executed maneuver comprises a lane change.

* * * * *